Oct. 21, 1924.  
C. A. SLOPER  
1,512,810  
SKIDLESS BRAKE FOR AUTOMOBILES  
Filed Oct. 20, 1923
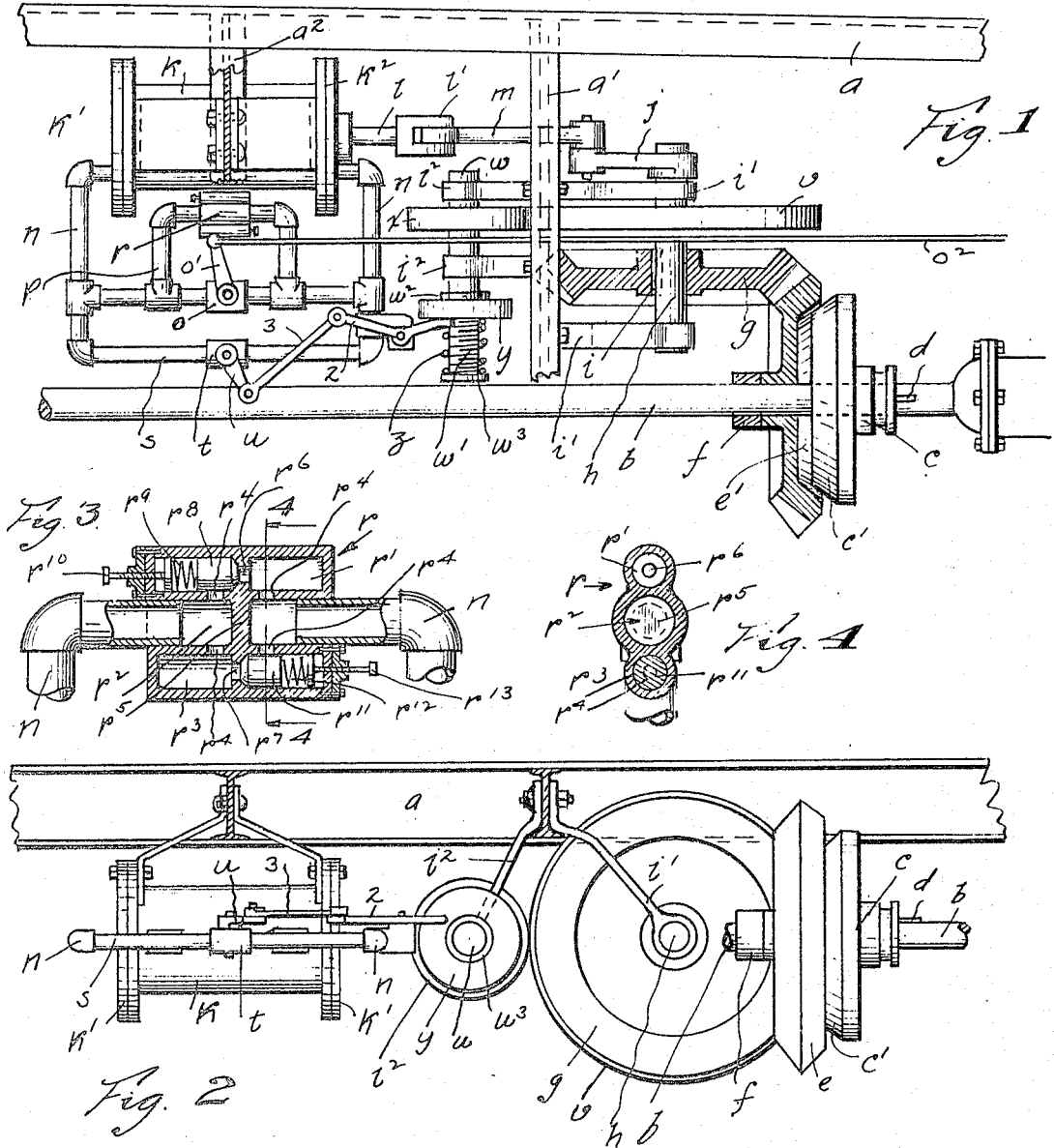
Inventor  
Charles A. Sloper Patented Oct. 21, 1924.

1,512,810

UNITED STATES PATENT OFFICE.

CHARLES A. SLOPER, OF RAINIER, OREGON.

SKIDLESS BRAKE FOR AUTOMOBILES.

Application filed October 20, 1923. Serial No. 669,763.

*To all whom it may concern:*

Be it known that I, CHARLES A. SLOPER, a citizen of the United States, and a resident of Rainier, county of Columbia, State of Oregon, have invented a certain new and useful Improvement in Skidless Brakes for Automobiles, of which the following is a specification.

This invention relates to hydraulic brakes which are adapted for use with an automobile and which are used either in conjunction with or as a substitute for the friction brakes which are in common use at the present time.

The object of my invention is to provide a hydraulic brake which is adapted for being connected or disconnected from the driving mechanism so that it will not exercise a dragging effect on the driving mechanism when the car is being driven.

A further object is to provide protective devices on my hydraulic brake which will prevent injury to the driving mechanism due to the sudden application of my improved brake in stopping the automobile.

A further object is to provide automatic means for controlling the rate of flow through the braking devices, so that the automobile will be stopped gradually and proportionate to the speed of the car even though the main control valve is suddenly closed.

I attain these objects by connecting to the propelling mechanism of a vehicle, a circulating pump provided with a pipe connecting its inlet and outlet sides, a valve in said pipe and means for opening and closing said valve, connections are provided between said propelling shaft and said pump whereby the rotation of said shaft operates said pump and the closing of said valves prevents its operation. I provide a clutch in said connections to permit the disengaging of said shaft from said pump. I also provide a by-pass around said valve which is controlled by an automatic valve, normally held closed, which is adapted to be opened by the presence of a predetermined pressure in the pipe. I also provide a second by-pass around said first mentioned valve which is controlled by another valve which is opened and closed by a governor connected to said propelling shaft, so as to prevent the sudden closure of said valve.

The construction and operation of my invention is hereinafter more fully described with reference to the accompanying drawings, in which—

Fig. 1 is a diagrammatic plan view of the mechanism connected with the propelling shaft of an automobile;

Fig. 2 is a side elevation of the mechanism shown in Fig. 1, except that the propelling shaft has been broken away to show the mechanism which it would thereby cover; and Figs. 3 and 4 are fragmentary perspectives showing details of construction, Fig. 4 being taken on the line 4—4 on Fig. 3.

My device is adapted to be carried by the frame $a$ of an automobile and to be operatively connected with its propelling shaft $b$. I provide a clutch member $c$ which rotates with the propelling shaft $b$, sliding on a key $d$. This clutch member $c$ is permitted to slide longitudinally on the shaft and in its opposite positions engages and disengages the beveled gear $e$ which is rotatably mounted on the shaft $b$. The gear $e$ is held against longitudinal movement by the bearing $f$. The gear $e$ is provided with a tapered recess $e'$ and the clutch member $c$ is provided with a tapered clutch face $c'$ which seats therein so that when the clutch member is moved towards the left, as viewed in Fig. 1, the gear will be engaged by the clutch member and will rotate with it.

I provide a beveled gear $g$ which meshes with the gear $e$, the gear $g$ being keyed to the shaft $h$ by the key $i$. The shaft $h$ is supported by brackets $i'$ which are connected to the cross piece $a'$ of the frame.

I provide an arm $j$ on one end of the shaft $h$ which is keyed thereto and thus forms a crank arm. The pump $k$ is supported by a cross frame $a^2$, of the frame $a$, and has a piston $l$ mounted for reciprocation therein. The end of the piston rod of the piston is bifurcated as at $l'$ and one end of the connecting rod $m$ is mounted therein, the other end being connected with the crank arm $j$. I provide a pipe $n$ which connects the opposite cylinder heads $k'$ and $k^2$ of the cylinder $k$, and thus when the piston reciprocates, it circulates the fluid through said pipe $n$.

I place a manually operated valve $o$ in the pipe $n$, said valve having an operating arm $o'$ controlled by the pull rod $o^2$. Thus, when the pull rod $o^2$ is moved in one direction it closes the valve, and when it is moved in the opposite direction it opens the same. I provide two by-passes around the valve, one of these by-passes $p$ being controlled by a double acting valve member $r$, and the other by-pass $s$ being controlled by valve $t$. The valve $r$ consists of a casting made with three elongate chambers $r'$, $r^2$ and $r^3$. These chambers are connected by four apertures $r^4$, so that the fluid tends to pass freely into any of these chambers. I provide a transverse partition $r^5$ which is provided with only two apertures $r^6$ located in the chamber $i$, and $r^7$. The aperture $r^6$ is controlled by a valve $r^8$ which is held in place by a spring $r^9$, the compression of which is adjusted by means of an adjustable stem $r^{10}$. The aperture $r^7$ in the chamber $i^3$ is controlled by the valve $r^{11}$, which is held in place by a spring $r^{12}$, the compression of which is adjustable by means of an adjustable stem $r^{13}$.

As mentioned, the by-passes are controlled by the valve $t$, which has an operating arm $u$. I provide a friction pulley $x$ on the shaft $w$ which is arranged parallel with the shaft $h$. This shaft is supported by the brackets $i^2$ which are mounted on the cross frame $a'$. A pulley $x$ is fastened to the shaft $w$ and is in frictional contact with the pulley $v$. Thus, the rotation of the pulley $v$ causes the pulley $x$ to be rotated in an opposite direction.

I thread this shaft $w$, at $w'$, and provide a freely rotatable member $y$ on the shaft at this point and provide a stop collar on said shaft, to limit the movement of the member $y$ in one direction. I mount a spring $z$ about said shaft between its enlarged end $w^3$ and the rotatable member $y$ which tends to hold the rotatable member $y$ against the stop collar $w^2$. This thread is a right hand thread as viewed in Fig. 1 and thus, if the shaft $w$ is rotated in a clockwise direction, as viewed in Fig. 2, the inertia of this rotatable member $y$ will cause this member to remain at rest and the shaft, as it starts to rotate, will thus tend to move this member $y$ longitudinally towards the end $w^3$ of the shaft $w$, and will thus compress the spring $z$. As long as this shaft $w$ continues to be a driving member, it will move the member $y$ with it but the member $y$ will always tend to lag slightly behind. I provide a pivoted lever 2, one end of which I place behind the member $y$ and the other end of which I connect with the lever 3. This lever 3 is connected in turn to the operating arm $u$ of the valve $t$ and thus as the member $y$ tends to move towards the end $w^3$ of the shaft $w$ it tends to open the valve, and as it moves away from the end it will tend to close the valve.

The operation of my valve is as follows:
When it is desired to stop the automobile on which my hydraulic brake is arranged the member $c$ is moved into contact with the gear $e$ and the rotation of this gear $e$ will in turn rotate the gear $g$ and therewith a shaft $h$. The rotation of the shaft $h$ causes the crank arm $j$ to reciprocate the connecting rod $m$ and therewith the piston $l$. The movement of this piston causes the fluid to be circulated through the pipes $n$ and by closing the valve $o$ slowly, the flow is thereby restricted through these pipes and, therefore, it will impose a braking effect upon the driving mechanism. If this valve $o$ is closed too suddenly, it would tend to injure the mechanism. I have arranged the valve member $r$ to prevent this. The pressure within the pipe $n$ tends to pass the fluid through the by-pass $p$, and whenever the pressure increases beyond that exerted by the spring $r^9$ or $r^{12}$, it will compress the spring and permit fluid to pass therethrough. The by-pass $s$ also permits fluid to pass around the valve $o$. When the automobile is traveling along at a fairly high rate of speed the valve $t$ will be held completely open and as the brakes are applied the inertia of the member $y$ tends to hold the valve open until it is overcome by the spring $z$. The sudden closing of the valve $o$, therefore, would not build up undue pressure within the pipe $n$ because these by-passes would be open for a short period of time after the initial application of the brakes and thus would permit a limited portion of the fluid to pass therethrough.

I claim:

1. In the vehicle, the combination with a propelling shaft of a circulating pump, a pipe connecting the inlet and outlet sides of said pump, a valve in said pipe, means for opening and closing said valve, connections between said propelling shaft and said pump, whereby the rotation of said shaft causes the operation of said pump and the closing of said valve prevents said pump from operating, a by-pass around said valve, controlled by an automatic valve, normally held closed, which is adapted to be opened by the presence of a predetermined pressure in the pipe.

2. In the vehicle, the combination with a propelling shaft of a circulating pump, a pipe connecting the inlet and outlet sides of said pump, a valve in said pipe, means for opening and closing said valve, connections between said propelling shaft and said pump, whereby the rotation of said shaft causes the operating of said pump and the closing of said valve prevents said pump from operating, a by-pass around said first mentioned valve which is controlled by another valve, a governor connected to said propelling shaft, a connecting element between said governor and said last mentioned valve which opens and closes said valve for the purpose specified.

3. In the vehicle, the combination with a propelling shaft of a circulating pump, a pipe connecting the inlet and outlet side of said pump, a valve in said pipe, means for opening and closing said valve, connections between said propelling shaft and said pump, whereby the rotation of said shaft causes the operation of said pump and the closing of said valve prevents said pump from operating, a by-pass around said valve, controlled by an automatic valve, normally held closed, which is adapted to be opened by the presence of a predetermined pressure in the pipe, a second by-pass around said first mentioned valve which is controlled by another valve, a governor connected to said propelling shaft, a connecting element between said governor and said last mentioned valve which opens and closes said valve for the purpose specified.

4. In the vehicle, the combination with a propelling shaft of a circulating pump, a pipe connecting the inlet and outlet sides of said pump, a valve in said pipe, means for opening and closing said valve, connections between said propelling shaft and said pump, a releasable clutch in said connections, whereby the rotation of said shaft causes the operation of said pump and the closing of said valve prevents said pump from operating, a by-pass around said valve, controlled by an automatic valve, normally held closed, which is adapted to be opened by the presence of a predetermined pressure in the pipe, a second by-pass around said first mentioned valve which is controlled by another valve, a governor connected to said propelling shaft, a connecting element between said governor and said last mentioned valve which opens and closes said valve for the purpose specified.

CHARLES A. SLOPER.